United States Patent
Grantham et al.

(10) Patent No.: US 6,821,631 B2
(45) Date of Patent: Nov. 23, 2004

(54) METHOD AND COMPOSITION FOR TREATING SUBSTRATES

(75) Inventors: Robert N. Grantham, Fort Myers, FL (US); Robert R. Weaver, III, Pensacola, FL (US)

(73) Assignee: Wood treatment Products, Inc., Lake Mary, FL (US)

( * ) Notice: Subject to any disclaimer, the term of this patent is extended or adjusted under 35 U.S.C. 154(b) by 0 days.

(21) Appl. No.: 10/283,036

(22) Filed: Oct. 28, 2002

(65) Prior Publication Data

US 2003/0118810 A1 Jun. 26, 2003

Related U.S. Application Data

(60) Provisional application No. 60/345,479, filed on Oct. 29, 2001.

(51) Int. Cl.⁷ ................................................. B32B 9/04
(52) U.S. Cl. ................. 428/453; 428/304.4; 428/306.6; 428/537.1; 428/537.5; 428/541; 427/254; 427/297; 427/298; 427/350; 427/351; 427/372.2; 427/397.7; 427/397.8; 427/487; 427/498; 427/499; 427/501; 427/508; 427/512; 427/513; 427/521; 427/532; 427/541; 427/542; 427/553; 427/554; 427/557; 427/595; 106/15.05; 106/18; 106/18.11; 106/18.12; 106/18.13; 106/18.29; 106/18.3; 106/600; 106/622; 106/628
(58) Field of Search ................................ 427/243, 254, 427/294, 297, 298, 350, 351, 372.2, 397.7, 397.8, 457, 487, 498, 499, 501, 508, 512, 513, 521, 532, 541, 542, 553, 554, 557, 595, 596; 428/304.4, 306.6, 446, 452, 453, 532, 537.1, 537.5, 540, 541; 106/15.05, 18, 18.11, 18.12, 18.13, 18.29, 18.3, 600, 622, 628

(56) References Cited

U.S. PATENT DOCUMENTS

| | | | |
|---|---|---|---|
| 2,998,310 | A | 8/1961 | O'Brien et al. |
| 3,306,765 | A | 2/1967 | Du Fresne et al. |
| 3,935,341 | A | 1/1976 | Sorensen et al. |
| 3,945,834 | A | 3/1976 | Clarke et al. |
| 3,945,835 | A | 3/1976 | Clarke et al. |
| 3,974,318 | A | 8/1976 | Lilla |
| 4,011,090 | A | 3/1977 | Clarke et al. |
| 4,038,086 | A | 7/1977 | Clarke et al. |
| 4,103,000 | A | 7/1978 | Hartford |
| 4,218,250 | A | 8/1980 | Kasprzak |
| 4,224,169 | A | 9/1980 | Retana |
| 4,269,626 | A | 5/1981 | Gorke et al. |
| 4,347,285 | A | * 8/1982 | Batdorf |
| 4,420,542 | A | 12/1983 | Sowers |
| 4,539,045 | A | 9/1985 | Wagner |
| 4,897,291 | A | 1/1990 | Kim |
| 5,017,222 | A | 5/1991 | Cifuentes et al. |
| 5,017,653 | A | 5/1991 | Johnston |
| 5,342,436 | A | 8/1994 | Thrasher |
| 5,460,751 | A | 10/1995 | Ma et al. |
| 5,478,598 | A | 12/1995 | Shiozawa |
| 5,506,001 | A | 4/1996 | Ma et al. |
| 5,589,229 | A | 12/1996 | Howard |
| 5,612,094 | A | 3/1997 | Schubert et al. |
| 5,679,407 | A | 10/1997 | Mansikkamaki et al. |
| 5,777,043 | A | 7/1998 | Shafer et al. |
| 6,040,057 | A | 3/2000 | Slimak et al. |
| 6,121,354 | A | 9/2000 | Chronister |
| 6,146,766 | A | 11/2000 | Slimak et al. |
| 6,235,346 | B1 | 5/2001 | Barnisin, Jr. |
| 6,235,349 | B1 | 5/2001 | Grantham et al. |
| 6,274,199 | B1 | 8/2001 | Preston et al. |
| 6,395,789 | B1 | * 5/2002 | Bessette et al. |
| 6,593,299 | B1 | * 7/2003 | Bennett et al. |

FOREIGN PATENT DOCUMENTS

| CA | 1164641 | 4/1984 |
|---|---|---|
| CA | 1214001 | 11/1986 |

* cited by examiner

*Primary Examiner*—Deborah Jones
*Assistant Examiner*—Wendy Boss
(74) *Attorney, Agent, or Firm*—Allen, Dyer, Doppelt, Milbrath & Gilchrist, P.A.

(57) ABSTRACT

A method of treating substrates, such as wood, including the steps of applying an alkali silicate solution to one or more substrates and applying an alkali borate solution with boric oxide ($B_2O_3$) content to the substrates. Substrates that have been treated using the present method include a borate-silicate polymer within the substrate. When the present substrates are wood, wood products, or green lumber, they may be used to build structures.

54 Claims, No Drawings

METHOD AND COMPOSITION FOR TREATING SUBSTRATES

CROSS-REFERENCE TO RELATED APPLICATIONS

This application claims the benefit of U.S. Provisional Application Ser. No. 60/345,479, filed Oct. 29, 2001, and entitled "Method and Composition for Treating Substrates," which is herein incorporated by reference.

BACKGROUND OF THE INVENTION

1. Field of the Invention

The present invention is directed to a formaldehyde-free method for treating substrates, especially wood products, such as lumber, to strengthen the substrate and to render it flame-retardant and resistant to moisture and insects.

2. Description of Related Art

Over the years, much effort has been directed to solving the problem of imparting fire-inhibiting properties to wood, as well as resistance to the growth of fungi, attack by termites, and moisture. Initial efforts aimed at imparting fire-inhibiting properties to wood included impregnation of the wood with fire-inhibiting salts that are applied in aqueous solution. For example, ammonium sulfate, sodium sulfate or magnesium sulfate, mono ammonium phosphate or diammonium phosphate, borates, or the like have been used. The fire-inhibiting or flameproofing effect of such salts may be based on the fact that their decomposition is endothermic and that on being heated, they easily form salts which envelop the inflammable substance, so that combustible gases are not given off and the wood carbonizes without any flames being formed. The use of such salts has a shortcoming, however, as even though they could easily impregnate the wood, they were rather easily washed out of the wood again due to their excellent water solubility.

U.S. Pat. No. 3,935,341 to Sorensen et al. discloses another method of imparting fire and pest resistance to wood. This method renders wood fire-resistant by impregnating the wood with a solution of phenol and a fire-inhibiting salt, drying the wood, followed by treating the wood with a solution of formaldehyde, which is polymerizable with the phenol. Heating the treated wood to dryness causes polymerization of the monomers. Wood products, such as those disclosed by Sorensen et al., have fallen out of favor in recent years due to the potential toxic environmental effects of residual formaldehyde in the treated wood.

U.S. Pat. Nos. 3,945,835 and 4,038,086 to Clarke et al. and U.S. Pat. No. 4,103,000 to Hartford disclose various aqueous wood treating and/or preservative compositions that contain copper ammonium and/or zinc ammonium cations and arsenic or arsenious anions to make, for example, chromated copper arsenate wood treating compositions. While effective at preserving wood, these materials are able to be leached from the wood by water and owing to the toxic nature of the compositions, can create a potential to harm the environment.

The most common wood preservative used in the United States is chromated copper arsenate (CCA). CCA is composed of the oxides of chromium, copper, and arsenic. The copper in the wood serves as a fungicide while the arsenic protects the wood from insects. A particular problem is encountered when CCA treated lumber is disposed of.

Typically, CCA treated lumber ends up in unlined landfills when disposed. However, there are growing concerns about the environmental impact of CCA treated lumber because surface and ground water eventually leach the various metals from the wood. CCA treated lumber has been identified as a major potential cause of elevated arsenic and chromium concentrations in the environment.

U.S. Pat. No. 3,974,318 to Lilla discloses a process whereby water soluble silicate compositions are applied to a wood product, and the product is subsequently treated with a water soluble metallic salt compound to form a water insoluble metallic silicate in the wood product. Improvements on this method have been disclosed in U.S. Pat. No. 6,235,349 to Grantham et al., U.S. Pat. No. 5,478,598 to Shiozawa, and U.S. Pat. Nos. 6,146,766 and 6,040,057 to Slimak et al. However, in all of these cases, the silicate-based treatment compositions can be leached from the wood by exposure to environmental water and moisture, which eventually causes the treated wood to loose its fire, insect, termite, and microbial attack resistance.

The use of boron-based formulation for wood preservation has been investigated because of the low acute oral and dermal toxicity of these materials, as well as their ability to render wood non-flammable when applied. Zinc borate hydrate, boric oxide, boric acid, borax, and disodium octaborate tetrahydrate (DOT) have become popular compounds for treating wood because of their ability to render wood resistant to decay from fungi, wood boring beetles, termites, and general household pests, such as cockroaches and silverfish. The use of boron-based treatments are generally limited to indoor use, as they are easily leached from the treated wood by environmental water and moisture.

There is an ongoing need for an environmentally safe composition and method for treating wood to render fire-inhibiting properties, as well as resistance to the growth of fungi, attack by termites, and moisture, especially lumber, wherein the treatment composition is resistant to being removed or leached from the treated wood due to exposure to environmental water and moisture.

SUMMARY OF THE INVENTION

The present invention is directed to a method of treating substrates, such as wood. The method includes the steps of (1) applying an alkali silicate solution to one or more substrates and (2) applying an alkali borate solution with boric oxide ($B_2O_3$) content to the substrates. The present invention is also directed to substrates that have been treated using the present method. Further, the present invention is directed to treated substrates that include a borate-silicate polymer within the substrate. Moreover, the present invention is directed to structures built using wood treated using the present method.

DESCRIPTION OF THE PREFERRED EMBODIMENT(S)

Unless otherwise indicated, all numbers or expressions referring to quantities of ingredients, reaction conditions, etc., used herein are to be understood as modified in all instances by the term "about."

Various numerical ranges are disclosed in this patent application. Because these ranges are continuous, they include every value between the minimum and maximum values. Unless expressly indicated otherwise, the various numerical ranges specified in this application are approximations.

As used herein and in the claims, the term "solution" refers to any homogeneous mixture of at least one material in a solvent. The term "solution" is not meant to exclude heterogeneous mixtures, where the material may not be completely miscible in the solvent, but is uniformly dispersed therein, or may become uniformly dispersed therein with the application of moderate mixing.

The present invention is generally directed to a method for treatment of substrates which preserves the substrate or substrate products and renders the substrate or substrate products fire, moisture, fungus, termite, and insect resistant. In an embodiment of the present invention, the substrate is wood or wood products.

As used herein and in the claims, the term "wood products" refers generally to products derived from wood, which includes, but is not limited to, oriented strand board (OSB), medium-density fiberboard (MDF), plywood, particleboard, paper products, natural wood products, including both green and dried lumber, as well as products made or derived from wood chips, wood pulp, and/or wood fiber. The treated wood products are generically useful for construction purposes, general construction methods, and as general construction materials. More specifically, for purpose of example only, the treated products may be used in flooring, fire doors, exterior beams and columns, fire panel materials and sheeting, and exterior sheeting, including siding, cabinet manufacturing, furniture manufacturing, railroad cross ties, landscape timbers, floor plating, fire-retardant lumber, door jambs, sea walls, countertops, exterior fascia material, and in window manufacturing. Other substrates upon which the present method may be applied include, but are not limited to, paper, cardboard, paper towels, sponges, porous plastics, and fabrics.

The present method includes the steps of (1) applying an alkali silicate solution to one or more pieces or articles of a substrate and (2) applying an alkali borate solution with boric oxide ($B_2O_3$) content to the substrate.

In the alkali silicate solution, any suitable alkali silicate may be used, so long as it is able to polymerize inside the treated substrate after contacting the alkali borate. Suitable alkali silicates include, but are not limited to, sodium silicate and potassium silicate, as well as ammonium silicate. The alkali silicate is present in the treatment solution at a level of at least 5 percent by weight, often at least 10 percent by weight, typically at least 15 percent by weight, and in some cases at least 18 percent by weight. When the level of alkali silicate in the treatment solution is too low, the treated substrate will not be adequately resistant to fire, decay, and infestation. The alkali silicate is present in the treatment solution at a level of up to 60 percent by weight, often up to 55 percent by weight, typically up to 50 percent by weight, and in some cases up to 45 percent by weight. When the level of alkali silicate is too high, the treatment solution may have a short shelf life as a result of a portion of the alkali silicate precipitating from solution. The alkali silicate may be present in the treatment solution in any range of values inclusive of those stated above.

The pH of the alkali silicate solution is greater than 9.0, often from 9.0–14.0, typically from 10.0–14.0, and in many cases about 13.0. When the alkali silicate solution is used in diluted form, it is desirable to maintain the pH of the solution at 11.2 to 11.4.

In the alkali borate solution, any suitable alkali borate may be used. Non-limiting examples include those alkali borates that provide at least a 20% boric oxide ($B_2O_3$) content. Examples of such suitable alkali borates include, but are not limited to, borax, disodium octaborate tetrahydrate, $Na_2B_8O_{13} \cdot H_2O$ (DOT, 67.1% as $B_2O_3$), and dodecaboron tetrazinc docosaoxide heptahydrate (48.0% as $B_2O_3$). Other suitable alkali borates include, but are not limited to, those having the structural units I–IV:

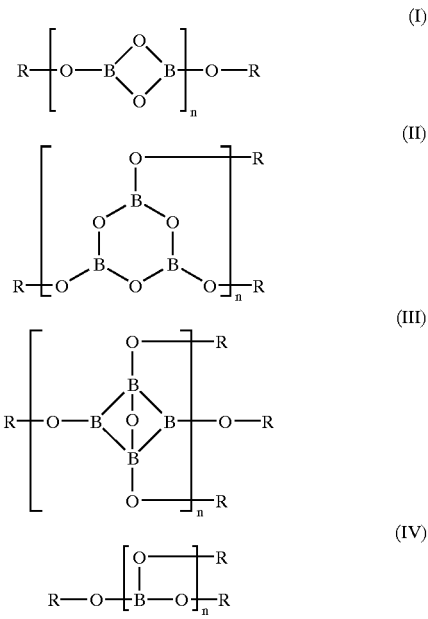

where R is independently for each occurrence H or $C_1$–$C_{20}$ linear or branched alkyl or an alkali metal or ammonium cation when O has a negative charge; and n represents the number of repeat units of each individual structure and is an integer of at least 1. The integer n may be as high as 25, in many cases 20, in other cases 15, typically 10, and in some cases 5. The integer n is not so high that it renders the alkali borate insoluble in water.

The alkali borate is present in the alkali borate solution at a level of at least 0.1 percent by weight, often at least 0.25 percent by weight, typically at least 0.5 percent by weight, and in some cases at least 1.0 percent by weight. When the level of alkali borate in the alkali borate solution is too low, the alkali borate may be an insufficient amount to react with the alkali silicate in the substrate. The alkali borate is present in the alkali borate solution at a level of up to 20 percent by weight, often up to 15 percent by weight, typically up to 12 percent by weight, in some situations up to 10 percent by weight, in some cases up to 5 percent by weight, and in other cases up to 3 percent by weight. When the level of alkali borate is too high, it may alter the desirable properties of the treated substrate. The alkali borate may be present in the alkali borate solution in any range of values inclusive of those stated above.

The pH of the alkali borate solution is generally near neutral, often from 6.0–9.0, typically from 6.5–8.5, and in many cases from 7.0–8.5.

The alkali silicate solution and/or the alkali borate solution may include a sealant composition. Any suitable sealant composition may be used in the present invention, so long as it is able to retard or prevent the substrate preserving components of the treatment solution from being leached or otherwise removed from the treated substrate due to exposure to environmental water or moisture and/or provide surface properties, such as surface sizing. Suitable sealant compositions include, but are not limited to, wax or paraffin-based materials, polymer-based materials, or mixtures thereof.

Suitable wax or paraffin-based sealant compositions include, but are not limited to, paraffin wax dispersed in mineral oil, such as is disclosed in U.S. Pat. No. 5,342,436 to Thrasher and wax in the form of micronized particles as disclosed by U.S. Pat. No. 5,017,222 to Cifuentes et al., both of which are herein incorporated by reference.

Suitable polymer-based sealant compositions include, but are not limited to, a mixture of a cyclodimethylsiloxane fluid and a polydiorganosiloxane-polyoxyalkylene copolymer as disclosed by U.S. Pat. No. 4,218,250 to Kasprzak; oxyalkalene polymers, such as those disclosed in U.S. Pat. Nos. 5,506,001 and 5,460,751 to Ma et al.; pyridine containing polymers, such as those disclosed by U.S. Pat. No. 4,420,542 to Sowers; amine modified polybutadienes, such as those disclosed in U.S. Pat. No. 4,269,626 to Gorke et al.; vinyl polymer latexes, such as those disclosed in U.S. Pat. Nos. 4,011,090 and 3,945,834 to Clarke et al.; and styrene butadiene copolymers, such as hydrogenated styrene butadiene copolymers, non-limiting examples of which are disclosed in U.S. Pat. No. 5,777,043, thermosetting styrene butadiene copolymers, non-limiting examples of which are disclosed in U.S. Pat. No. 5,017,653 to Johnston, and a styrene-butadiene rubber (SBR) latex, which may be the product of a polymerization carried out in an emulsion system where a mixture of at least two monomers (styrene and butadiene) is mixed with an aqueous soap (or other surface active agent) solution containing the necessary polymerization initiators as is well known in the art. The final product is an oil-in-water emulsion of the resulting copolymer, i.e., a fluid latex. Examples of commercially available SBR latexes that may be used in the present invention include, but are not limited to the SYNTHOMER styrene butadiene latexes available from Synthomer Limited, Harlow, Essex, United Kingdom and the CP Modified S/B Latexes, the DL Modified S/B Latexes, the FC Modified S/B Latexes, the PB Modified S/B Latexes, the CT Modified S/B Latexes, the HS Hollow Sphere Plastic Pigment Latexes, the A Solid Plastic Pigment Latexes, the HS Solid Plastic Pigment Latexes and the PB Solid Plastic Pigment Latexes available from Dow Chemical Co., Midland, Mich.

Examples of sealant compositions that are mixtures of wax or paraffin-based sealants, and polymer-based sealants include, but are not limited to, mixtures of the above-mentioned wax or paraffin-based sealant compositions and polymer-based sealant compositions; mixtures of a styrene block copolymer, styrene-butadiene copolymer, a moisture-curable silylated polyurethane prepolymer, an aromatic tackifier resin, a polar tackifier resin, a polyethylene wax, and an organo silane adhesion promoter as disclosed in U.S. Pat. No. 6,121,354 to Chronister; and a water-based polymeric binder and a wax hydrophobic filler as disclosed in U.S. Pat. No. 4,897,291 to Kim. A non-limiting example of suitable wax or paraffin-based sealant compositions are those available from Michelman, Inc., Cincinnati, Ohio, such as Michem®-Wood Coat 50.

The sealant composition is present in the alkali silicate solution and/or the alkali borate solution at a level of at least 0.1 percent by weight, often at least 0.25 percent by weight, typically at least 0.5 percent by weight, and in some cases at least 1.0 percent by weight. When the level of sealant composition in the alkali silicate solution and/or the alkali borate solution is too low, the substrate treating materials in the treated substrate may be leached out or removed by environmental water and moisture. The sealant composition is present in the alkali silicate solution and/or the alkali borate solution at a level of up to 20 percent by weight, often up to 15 percent by weight, typically up to 12 percent by weight, in some situations up to 10 percent by weight, and in some cases up to 5 percent by weight. When the level of sealant material is too high, the alkali silicate solution and/or the alkali borate solution may be too viscous to be applied properly and may not have the required ability to penetrate the substrate. The sealant composition may be present in the alkali silicate solution and/or the alkali borate solution in any range of values inclusive of those stated above.

In an embodiment of the present invention, the alkali silicate solution and the alkali borate solution are applied sequentially. The sealant composition will typically be included in the solution that is added last so that it will have a greater impact on the surface properties of the treated substrate.

The alkali silicate solution and/or the alkali borate solution may include one or more bactericides, insecticides, or fungicides. Examples of suitable bactericides and fungicides include, but are not limited to, DOWCIL-75, available from Dow Chemical Company, Midland, Mich.; parabens, such as methyl paraben and propyl paraben; disodium cyanodithioimidocarbonate; methylene bis thiocyanate; isothiazolin; glutaraldehyde; dithiocarbamates; quaternary ammonium compounds; dibromonitrilopropionamide; dibromo dicyano butane; dodecylguanidine hydrochloride; organophosphate insecticides, such as malathion, ethl-parathion, and diazinon; organosulfur insecticides, such as tetradifon, propargite, and ovex; carbamate insecticides, such as carbaryl, methomyl, carbofuran, aldicarb, oxamyl, thiodicarb, methiocarb, propoxur, bendiocarb, carbosulfam, aldoxycarb, promecarb, and fenoxycarb; formamidine insecticides, such as amitraz, dinitropheol insecticides, such as 2,4-dinitrophenol; organotin insecticides, such as cyhexatin; pyrethroid insecticides, such as allethrin, tetramethrin, fenvalerate, acrinathrin, and permethrin; nicotinoid insecticides, such as 1-(6-chloro-3-pyridin-3-ylmethyl)-n-nitro-imidazolidin-2-ylidenamine, and mixtures thereof.

When a bactericide, insecticide, and/or fungicide are used, they are independently present in the alkali silicate solution and/or the alkali borate solution at a level of at least 0.01 percent by weight, often at least 0.1 percent by weight, typically at least 0.15 percent by weight, and in some cases at least 0.2 percent by weight. When the level of bactericide, insecticide, and/or fungicide in the alkali silicate solution and/or the alkali borate solution is too low, the treated substrate may not be adequately resistant to insect, termite, or microbial infestation. The bactericide, insecticide, and/or fungicide are independently present in the alkali silicate solution and/or the alkali borate solution at a level of up to 10 percent by weight, often up to 5 percent by weight, typically up to 3 percent by weight, and in some cases up to 2 percent by weight. When the level of bactericide, insecticide, and/or fungicide is too high, the alkali silicate solution and/or the alkali borate solution may not be economically used on a commercial scale. The bactericide, insecticide, and/or fungicide may independently be present in the alkali silicate solution and/or the alkali borate solution in any range of values inclusive of those stated above.

When a rheology modifier is included in the present alkali silicate solution and/or the alkali borate solution, it is included at a level of at least 0.01 percent by weight, often at least 0.1 percent by weight, typically at least 0.15 percent by weight, and in some cases at least 0.2 percent by weight. When the level of rheology modifier in the alkali silicate solution and/or the alkali borate solution is too low, the alkali silicate solution may not have an optimum flow profile, resulting in not enough alkali silicate solution and/or alkali borate solution penetrating the substrate. The rheology modifier is present in the alkali silicate solution and/or the alkali borate solution at a level of up to 5 percent by weight, often up to 4 percent by weight, typically up to 3 percent by weight, and in some cases up to 2 percent by weight. When the level of rheology modifier is too high, the alkali silicate solution and/or the alkali borate solution may be too viscous to be applied properly and may not have the required ability to penetrate the substrate. The rheology modifier may be present in the alkali silicate solution and/or the alkali borate solution in any range of values inclusive of those stated above.

Any suitable rheology modifier may be used in the present alkali silicate solution and/or the alkali borate solution, so long as it is able to provide a flow profile to the solution that allows the solution to impregnate and/or infuse into the substrate to be treated. Examples of suitable rheology modifiers include, but are not limited to, thickening agents including cellulosic agents, such as hydroxymethyl cellulose and carboxymethyl cellulose; byproducts from the manufacture of paper, such as lignum, lignin, and culmonol; acrylic thickeners, such as alkali swellable latexes; natural gums, such as xanthan and guar; and acrylamide-based thickeners.

As used herein and in the claims, the term "lignum" refers to polymers and tissues found in wood, which may be isolated, for example, during wood chipping, wood pulping and other such operations performed in the manufacture of paper and paper products.

As used herein and in the claims, the term "lignin" refers to any of the complex polymers that are deposited within the cellulose of a plant cell, as well as derivatives thereof, that tend to act as a natural glue by tying together cellulose fibers, making the plant rigid, which have been subsequently removed and isolated from the plant and impart changes in the rheological properties of solutions that they have been added to. Examples of lignin and modified lignin include, but are not limited to the sulfonated lignins available under the trade names KRAFTSPERSE, REAX, POLYFON and INDULIN from MeadWestvaco Corporation, Charleston, S.C.

As used herein and in the claims, the term "culmonol" refers to natural substance occurring in various plants and trees which may be isolated, for example, during wood chipping, wood pulping, and other such operations performed in the manufacture of paper and paper products.

As used herein and in the claims, the term "wetting agent" refers to a material, that when added to a liquid, increases the liquid's ability to penetrate, or spread over the surface of a given substrate.

When a wetting agent is included in the present alkali silicate solution and/or alkali borate solution, it is included at a level of at least 0.01 percent by weight, often at least 0.1 percent by weight, typically at least 0.15 percent by weight, and in some cases at least 0.2 percent by weight. When the level of wetting agent in the alkali silicate solution and/or the alkali borate solution is too low, the solution may not adequately penetrate into the substrate during application. The wetting agent is present in the alkali silicate solution and/or the alkali borate solution at a level of up to 10 percent by weight, often up to 5 percent by weight, typically up to 4 percent by weight, and in some cases up to 2 percent by weight. When the level of wetting agent is too high, the alkali silicate solution and/or the alkali borate solution may tend to foam during application, which may create operational problems on a commercial scale. The wetting agent may be present in the alkali silicate solution and/or the alkali borate solution in any range of values inclusive of those stated above.

Any suitable wetting agent may be used in the present alkali silicate solution and/or the alkali borate solution. Examples of suitable wetting agents include, but are not limited to, silicates, such as metasodium silicate; anionic surfactants, such as sodium dodecyl sulfate and sodium lauryl sulfate; cationic surfactants; amphoteric surfactants; zwitterionic surfactants; and phosphates, such as trisodium phosphate and tetrasodium pyrophosphate In some cases, the various components of the alkali silicate solution and/or the alkali borate solution may not be compatible with each other or the generally water-based carrier solvent of the solution. Compatibility is the ability of specified components to form homogeneous (one-phase) mixtures. When such is the case, one or more coupling agents may be added to the formulation. Coupling agents generally include co-solvents, surfactants, or other wetting agents that improve the compatibility of various formulation components with the carrier solvent. For example, a coupling solvent may be an active solvent for a resin component to be dissolved in the carrier solvent. Coupling agents increase the limit of dilution of hydrophilic resins with water and may improve alkali silicate solution performance due to better compatibility of various combinations of alkali silicate solution components. Examples of coupling agents that may be used in the present alkali silicate solution include, but are not limited to, glycol ethers, such as the ethylene glycol monoalkyl ethers, diethylene glycol monoalkyl ethers and propylene glycol monoalkyl ethers available from Eastman Chemical Company, Kingsport, Tenn.; linear or branched $C_1$–$C_{12}$ alcohols; linear or branched $C_1$–$C_{12}$ acetates; alkali salts of alkyl, aryl, or alkylaryl sulfonates, such as the sodium or ammonium salts of xylene sulfonate or naphthalene sulfonate; betaine surfactants, such as fatty amidoalkyl betaines; fatty acids; ketones, such as acetone, methylethylketone, methyl isobutyl ketone, and D-limonene; and the like, as well as mixtures thereof.

When a coupling agent is included in the present alkali silicate solution and/or the alkali borate solution, it is included at a level of at least 0.01 percent by weight, often at least 0.1 percent by weight, typically at least 0.15 percent by weight, and in some cases at least 0.2 percent by weight. When the level of coupling agent in the alkali silicate solution and/or the alkali borate solution is too low, the alkali silicate solution may separate into two or more phases on standing, making it difficult to handle or to have a short shelf life due to instability. The coupling agent is present in the alkali silicate solution and/or the alkali borate solution at a level of up to 20 percent by weight, often up to 15 percent by weight, typically up to 10 percent by weight, and in some cases up to 5 percent by weight. When the level of coupling agent is too high, it may alter desirable properties of the alkali silicate solution and/or the alkali borate solution. For example, it may require more energy to dry the treated substrate. The coupling agent may be present in the alkali silicate solution and/or the alkali borate solution in any range of values inclusive of those stated above.

The alkali silicate solution and/or the alkali borate solution may include any other desirable additive, such as a suitable dye or staining agent. Further, the alkali silicate solution may contain borates so long as they do not make the solution unstable.

As used herein and in the claims, the term "unstable solution" refers to a solution that does not gel, phase separate, or that no solids or precipitates form from the solution over a period of time of one month at ambient conditions from the time solution was made.

In a presently preferred embodiment, the sodium silicate treatment solution includes 67–84.2 wt. % water, 15–20 wt.

% sodium silicate, 0–10 wt. % sealant composition, 0.1–2 wt. % wetting agent, 0.1–2 wt. % rheology modifier, 0.1–2 wt. % borax, and 0–0.5 wt. % bactericide or fungicide. Further, in this embodiment, the wetting agent is a mixture of trisodium phosphate and sodium metasilicate, the sealant composition is a styrene-butadiene copolymer, and the rheology modifier is a mixture of lignum and culmonol. The alkali borate solution is a 2–10 wt. % solution of DOT.

In the present invention, when the alkali silicate solution and alkali borate solution are mixed, the solution gels on standing when certain proportions of the active ingredients are combined. When the gel is dried to a powder, the powder will not resolubilize in water. While not being bound to any single theory, it is believed that the present two-step treatment allows the water insoluble product to form inside the substrate. The reaction between the silicates, borates, and/or the sealant composition form the water insoluble product. It is believed that other functional components of the silicate solution and borate solution will also incorporate into the water insoluble product composition. As a non-limiting example, if phosphate or metasilicate wetting agents are used, their functionality will allow them to incorporate into the water insoluble product composition. The water insoluble product is believed to include a silicate-borate polymer.

As used herein and in the claims, the term "water insoluble" refers to materials that do not readily form homogeneous solutions in water. Generally, if distinct particulates are visible at a concentration of 0.1 g/100 g of distilled water at a pH of from 6.0–8.0, the material will be considered water insoluble.

In an embodiment of the present invention, the water insoluble product composition forms without the need to apply heat or any other form of energy to the treated substrate. The reaction forming the water insoluble product occurs when suitable ratios of the silicate and borate aqueous solutions and/or sealant composition are combined. The suitable ratios will often depend on the components and concentrations employed. Suitable molar ratios of silicates to borates are at least 42:1, and may be 30:1, in many cases 20:1, typically 10:1, and in some cases 5:1. On the other hand, the borate may be in excess, in which case, the suitable molar ratios of silicates to borates may be 1:40, and in many cases 1:30, in other cases 1:20, typically 1:10, and in some cases 1:5. The molar ratio of alkali silicate to alkali borate may be in any range of values inclusive of those stated above.

In the present invention, the alkali silicate solution and the alkali borate solution may be applied by any suitable method. Suitable methods include, but are not limited to, pressure treating, brush application, spray application, dipping, soaking, and other methods known in the art. The order in which the alkali silicate solution and the alkali borate solution are applied to the substrate is not critical. Typically, the sodium borate solution is applied first and is allowed to penetrate into the substrate prior to applying the alkali silicate sodium borate solution. Further, although the present method is particularly suited for treating wood, it may be used to treat any number of suitable substrates that the alkali silicate solution and the alkali borate solutions can penetrate. Suitable substrates include, but are not limited to, paper, cardboard, paper towels, sponges, porous plastics, and fabrics. It has been found that when the water insoluble product forms within such substrates and the treated substrate is dried, the presence of the water insoluble product provides structural rigidity in addition to fire and pest resistance.

In an embodiment of the present invention, either or both of the alkali silicate solution and the alkali borate solution may be in a "concentrated" form, where the total solids of the solution is at least 20 wt. %, and just prior to use, the concentrated solution is diluted with a suitable solvent such that the total solids of the diluted solution is less than 10 wt. %. Suitable solvents include, but are not limited to, water miscible hydrocarbons, alcohols, and water. Total solids are determined by placing a known weight of a treatment solution in an oven at 60° C. for 12 hours and measuring the weight of the residual solids. The percent solids is calculated by dividing the weight of the residual solids by the original weight of the treatment solution and multiplying by 100.

A presently preferred method of treating wood includes pressure treating the wood products with the alkali silicate solution and the alkali borate solution. The pressure treating method of the present invention includes the following steps: placing the wood material in a pressure vessel and applying a vacuum; contacting the wood material with the present sodium borate solution; increasing the pressure in the pressure vessel; draining the sodium borate solution; contacting the wood material with the present alkali silicate solution; increasing the pressure in the pressure vessel; and draining the alkali silicate. The method may include subsequent steps of reducing the pressure by applying a vacuum to the pressure vessel and drying the treated wood product through the application of energy. The application of pressure followed by the application of a vacuum may be repeated, as desired, to increase the penetration of the treatment solution into the wood. The present method is useful, for example, for treating green lumber or dried and/or engineered wood products.

As used herein and in the claims, the term "green lumber" refers to wood that has a moisture content of at least 40%. The moisture content of the wood, usually expressed in a percentage, is a ratio of the amount of water in a piece of wood compared to the weight of such wood when all of the moisture has been removed. The moisture content may be determined by the moisture content on oven-dry basis method. In this method, the moisture content of wood is determined by weighing a given sample of wood (wet weight), placing it into an oven at a temperature not to exceed 100° C., until all of the moisture has been removed from the wood (the "oven-dry weight"). The oven-dry weight is then subtracted from the wet weight, and the resultant is then divided by the oven-dry weight. The resultant figure is then multiplied by 100 to determine the moisture content percentage. When a tree, such as red or white oak, fir, maple, spruce, ash, southern yellow pine, or any one of the many species of trees that yield wood that is useful in the production of wood products, is initially cut down, it has a moisture content of anywhere from about 60% to 100%.

The application of energy includes the use of radiant heat, electrical current, microwaves, lasers, convection ovens, dehydration, spot heating to high temperatures for short periods of time, and the like.

It has been observed that the treatment actives used in the present method are not readily leached from the treated wood when the present method is used. For example, the active borates have been found to be present in the treated wood at active levels after the American Wood Preserver's Association Standard E11-97 fourteen day leach test as well as after fourteen days of soaking in water in a bucket at ambient temperatures.

When the pressure vessel is pressurized, the pressure will be at least 10 pounds per square inch (psi), in many cases at least 20 psi, typically at least 30 psi, and in some cases at least 40 psi greater than atmospheric pressure. When the pressure in the pressure vessel is too low, the treatment solution may not adequately penetrate into the wood. When the pressure vessel is pressurized, the pressure can be up to 500 pounds per square inch (psi), in many cases up to 300 psi, typically up to 250 psi, and in some cases up to 200 psi greater than atmospheric pressure. The upper limit of pressure is typically limited by the pressure rating of the pressure vessel. In an embodiment of the present invention, the pressure of the pressure vessel is 30 to 160 psi in excess of atmospheric pressure when applied to the wood products. In another embodiment of the present invention, a pressure of 30 psi is applied when particleboard, MDF, OSB, and dried southern yellow pine are treated using the present method. In a further embodiment of the present invention, a pressure of 140 psi is applied when natural wood products are treated using the present method. In another embodiment of the present invention, a pressure of 30 psi is applied when yellow pine wood products are treated using the present method. The pressure used in the present method may be in any range of values inclusive of those stated above.

During pressure treatment, the treatment solution may be circulated under pressure for at least one minute, in many cases for two minutes, typically four minutes, and in certain cases for five minutes. The pressure treatment time must be long enough to ensure good penetration into the wood and will vary depending on the type of wood being treated. The circulation time will be up to four hours, in many cases up to three hours, typically up to two hours, and in certain cases up to ninety minutes. Wood products are typically treated for thirty minutes. Particleboard, MDF, OSB, and natural wood products are treated for thirty to ninety minutes. The length of time for pressure treatment may be in any range of values inclusive of those stated above. After treatment, the chamber is opened, and the treated wood product is removed.

After treatment, the chamber is drained and a vacuum, as described above, may be applied for five to twenty minutes.

When the vacuum is applied, the pressure in the pressure vessel is reduced to less than 750 mm Hg, in many cases to less than 500 mm Hg, typically to less than 300 mm Hg, and in some cases to less than 200 mm Hg. If the pressure is too high when the vacuum is applied, the treatment solution may not adequately penetrate into the interior of the wood cells. When the vacuum is applied, the pressure in the pressure vessel is at least 1 mm Hg, in many cases at least 10 mm Hg, typically to at least 20 mm Hg, and in some cases at least 30 mm Hg. The pressure is limited based on the rating of the pressure vessel. Further, when the pressure is too low, excessive foaming of the treatment solution may result. When a vacuum is applied, the pressure in the pressure vessel may be any range of values inclusive of those stated above.

The treated wood may be dried or cured through the application of energy to the treated wood. In an embodiment of the present invention, the treated wood product is either placed in a drying kiln and slow-dried for twenty-four hours with hot air and steam, air dried for ten days, or microwave dried for up to eight hours.

The treatment method of the present invention can also be used in a variety of methods commonly used for preparation of "engineered" wood products, such as, without limitation, particleboard, fiberboard, and oriented strand board. These wood products are generally prepared by forming a slurry of wood fibers or particles and an appropriate glue. The slurry is placed in a steam press, forming the wood product. The wood product is subsequently cured. According to one embodiment of the present invention, the cured wood product is pressure treated as described above.

The wood product can also be treated with the treatment method at an earlier stage. In one version of the method of the present invention, the alkali silicate solution and alkali borate solution are alternately, along with additional additives, mixed into the slurry of wood fibers or particles and glue, prior to placing the slurry into the steam press. Alternatively, the treatment solutions and additives are added to the press after the slurry is placed into the press. Importantly, the superior penetrating and preservation activity of the treatment method according to the present invention allows addition of the treatment solutions and/or any further additives at any time during the preparation of the engineered wood product, or afterward, so long as the addition of the treatment solutions is physically possible.

A particular advantage of the present method for treating wood is that treating solutions left on the surface of the wood after treatment tend to adsorb into the wood, eventually leaving a dry and clean appearance. With CCA treated wood, there is often treatment solution left on the surface of the wood that tends to remain, even when the treated wood has been delivered for commercial retail sale. This left over CCA treatment solution can create a toxicological and/or environmental hazard when it runs onto the floor of a store or into the surface groundwater.

The treated wood resulting from the present invention is unique in that it is wood that contains the water insoluble product that results from the combination of the alkali silicate and alkali borate solutions. It is believed that the water insoluble product includes a silicate-borate polymer. The presence of this material generally acts to make the treated wood harder than corresponding untreated wood. In many cases, the surface properties of the wood are altered such that the surface is more easily wetted, which promotes good adhesion and compatibility with surface coating compositions, such as paints and sealants.

The treated wood of the present invention can be used with good effect as a construction material. To that end, the present invention is directed to structures built using the treated wood of the present invention. Such structures are resistant to decay and infestation. Any structure that may be built from wood may be built with the treated wood of the present invention. Specific structures and items that may be built using the present treated wood or lumber include, but are not limited to houses, buildings, sheds, piers, docks, decks, utility poles, sign posts, fences, retaining walls, landscaping timbers, and picnic tables.

The present invention is more particularly described in the following Examples, which are intended to be illustrative only, since numerous modifications and variations therein will be apparent to those skilled in the art. Unless otherwise specified, all parts and percentages are by weight.

EXAMPLE 1

These Examples demonstrate the formation of the water insoluble product using the two step method of the present invention.

The following alkali silicate solution was prepared by mixing the listed ingredients (all in approximate weight percentages):

| Alkali silicate solution (AS1) | |
|---|---|
| Sodium Silicate (AS1) | 20% |
| Sodium Metasilicate | 2% |

-continued

| Alkali silicate solution (AS1) | |
|---|---|
| Trisodium Phosphate | 0.5% |
| Lignum[1] | 0.5% |
| Culmonol | 0.5% |
| Water | 76.5% |

[1]MeadWestvaco Corp., Charleston, SC.

A second alkali silicate (AS2) solution was prepared by making a 3:1 volume dilution of AS1 with water.

Two alkali borate solutions were prepared. ABS1 was an approximately 5 wt. % solution of DOT and ABS2 was an approximately 2.5 wt. % solution of 5 Mol Borax available from U.S. Borax, Inc., Valencia, Calif.

The alkali silicate solutions and alkali borate solutions were combined in glass vessels in the volume ratios outlined and results as noted in Table 1.

TABLE 1

| Vol. Ratio Solutions | Result |
|---|---|
| 1 AS2:1 ABS1 | stiff opaque gel within 3 minutes |
| 2 AS2:1 ABS1 | stiff opaque gel within 5 minutes |
| 1 AS1:1 ABS1 | little to no gel formation |
| 1 AS2:1 ABS2 | stiff opaque gel after 16 hours |

The data demonstrate the formation of the water insoluble product and the necessity for the proper molar ratio of silicates to borates for its formation.

EXAMPLES 2 and 3

This Example demonstrates the non-leaching quality of the silicate-borate water insoluble product formed within a wood substrate according to the pressure treating method of the present invention.

Treatment solution 1 (TS1) was a standard treatment solution that contains AS1 as listed above as well as 0.5 wt. % 5 mol Borax.

Treatment solution 2 included AS1 and 0.5 wt. % DOT, but could not be used because it gelled on standing, making it unusable for pressure treating wood.

Treatment solution 3 (TS3) was AS2 and treatment solution 4 (TS4) was ABS1.

For comparison purposes, 2 inch by 2 inch cubes of southern yellow pine were treated by applying TS1 at 100 psi for five minutes and then dried in a kiln at 60° C. for twenty-four hours. These treated wood blocks constitute Example 2.

A second set of 2 inch by 2 inch yellow pine cubes were treated using the present method. TS3 was applied at 100 psi for five minutes which was followed by application of TS4 at 135 psi for ten minutes and then dried in a kiln at 60° C. for twenty-four hours. These treated blocks constitute Example 3.

After fourteen days of soaking in water, the blocks of Example 3 had greater than 0.3% borate content while the blocks of Example 2 had no detectable level of borate. The borate level in Example 2 exceeded the AWPA level recommended for Formosa termites.

EXAMPLES 4 and 5

This example demonstrates the non-leaching quality of the silicate-borate water insoluble product formed within a wood substrate according to the pressure treating method of the present invention.

| Alkali silicate solution (AS3) | |
|---|---|
| Sodium Silicate | 20% |
| Sodium Metasilicate | 2% |
| Trisodium Phosphate | 0.5% |
| Lignum[1] | 0.5% |
| Culmonol | 0.5% |
| Styrene-Butadiene Copolymer[2] | 4.0% |
| Water | 72.5% |

[1]MeadWestvaco Corp., Charleston, SC.
[2]Dow Chemical Co., Midland, MI.

Treatment solution 5 (TS5) was a standard treatment solution that contained AS3 as listed above, as well as 0.5 wt. % 5 mol Borax.

Treatment solution 6 (TS6) was AS3 and treatment solution 7 (TS7) was ABS1, as described above.

For comparison purposes, 2 inch by 2 inch cubes of southern yellow pine were treated by applying TS5 at 100 psi for five minutes and then dried in a kiln at 60° C. for twenty-four hours. These treated wood blocks constituted Example 4.

A second set of 2 inch by 2 inch yellow pine cubes were treated using the present method. TS6 was applied at 100 psi for five minutes which was followed by application of TS7 at 135 psi for ten minutes and then dried in a kiln at 60° C. for twenty-four hours. These treated blocks constituted Example 5.

After fourteen days of soaking in water, the blocks of Example 5 had greater than 0.3% borate content while the blocks of Example 4 had no detectable level of borate. The borate level in Example 5 exceeded the AWPA level recommended for Formosa termites.

EXAMPLE 6

Southern yellow pine boards (5 cm×15 cm) were treated using the present method. TS6 was applied at 100 psi for five minutes which was followed by application of TS7 at 135 psi for ten minutes and then dried in a kiln at 60° C. for twnety-four hours. The boards were then cut into 1 meter lengths, with a thin wafer being cut from each length for measuring initial borate levels.

The borate levels were determined by grinding the samples and digesting them in nitric acid/hydrogen peroxide. The extract from the digestion was analyzed using inductively coupled plasma spectroscopy (ICP). The initial borate level was 6,096 g/m$^2$ (0.38 pcf).

Eight samples were include so three boards could be removed and analyzed for changes in borate levels. The samples were exposed to repeating cycles that include:

(1) exposure to combined ultra-violet radiation and infra red radiation exposure for forty-eight hours at 50°–60° C.;

(2) intermittent water spray for one hour followed by three hours with no spray, this regime was repeated twelve times (forty-eight hours total);

(3) freezing at −15° C. for forty-eight hours.

Three samples were evaluated after three cycles and the remainder were evaluated after eight total cycles. The results are summarized in the table below.

| Sample No. | Cycle No. | Borate level (g/m² as $B_2O_3$) | Borate Retention wt. % | Borate Leached wt. % |
|---|---|---|---|---|
| 1 | 0 | 6,096 | 100 | 0 |
| 2 | 3 | 4,331 | 65 | 35 |
| 3 | 8 | 3,273 | 54 | 46 |

Samples 19 mm×19 mm of untreated southern yellow pine boards, and from boards from Sample No. 2 and Sample No. 3 in the table above were tested for preservation using laboratory soil block cultures. Two blocks of each board were exposed to each of the brown rotting fungi *Posita placenta* and *Gleophyllum trabeum*. Untreated southern yellow pine sapwood feeder strips were placed in soil jars and sterilized and inoculated with the two fungi and left at 26 C. and 90% RH for three weeks to allow the fungi to develop on the feeder strips. The test blocks were conditioned to 8% MC, weighed and sterilized (by autoclave) and placed on the feeder strips and conditioned for twelve weeks at 26 C. and 90% RH. After exposure, the blocks were re-conditioned to 8% MC and weighed and weight loss determined as shown in the table below.

| Wood Sample Tested | Fungus | Average % Mass loss | Maximum % Mass loss |
|---|---|---|---|
| Sample No. 2 | *Posita placenta* | 1.7 | 2.1 |
| Sample No. 2 | *Gleophyllum trabeum* | 1.8 | 2.2 |
| Sample No. 3 | *Posita placenta* | 3.3 | 9.2 |
| Sample No. 3 | *Gleophyllum trabeum* | 0.5 | 9.3 |
| Untreated SLP[1] | *Posita placenta* | 34.5 | 35.0 |
| Untreated SLP[1] | *Gleophyllum trabeum* | 29.0 | 30.9 |

[1]SLP - Southern Yellow Pine

The data demonstrate that after eight cycles, less than half of the borate was leached from the treated yellow pine samples. Further, even after repeated exposure to the elements, the present treatment leaves a permanent, silicate-borate reaction product or polymer that is able to render the treated wood insect and pest resistant, as well as fire resistant.

EXAMPLES 7 and 8

This Example demonstrates the advantage of using a sealant in the wood treating composition of the present invention. Two alkali silicate treatment solutions AS7 (Example 7) and AS8 (Example 8) were prepared as indicated in the following table:

| Alkali silicate solution | AS7 | AS8 |
|---|---|---|
| Sodium Silicate | 20% | 20% |
| Sodium Metasilicate | 2% | 2% |
| Trisodium Phosphate | 0.5% | 0.5% |
| Lignum[1] | 0.5% | 0.5% |
| Culmonol | 0.5% | 0.5% |
| Styrene-Butadiene Copolymer[2] | 4.0% | |
| Water | 72.5% | 76.5% |

[1]MeadWestvaco Corp., Charleston, SC.
[2]Dow Chemical Co., Midland, MI.

Treatment solution 8 (TS8) was a 5 wt. % 5 mol borax solution.

Southern yellow pine boards (5 cm×15 cm) were treated using the present method. The alkali silicate solutions were applied separately to boards at 100 psi for five minutes which was followed by application of TS8 in each case at 135 psi for ten minutes and then dried in a kiln at 60° C. for twnety-four hours. The boards were then cut into 1 meter lengths, with a thin wafer being cut from each length for measuring initial borate levels. The borate levels were determined as described above.

Five samples were include and were analyzed for changes in borate levels. The samples were exposed to repeating cycles as described above.

The samples were evaluated initially and after five total cycles. The borate retention was determined by the equation [1-(change in borate level/initial borate level)]. The results are summarized in the table below.

| Sample No. | Borate Retention wt. % |
|---|---|
| Example 7 | 72 |
| Example 8 | 55 |

The Example demonstrates the increased retention rate (resistance to weathering) when an alkali silicate treatment solution including a sealant is used in the method of the present invention.

EXAMPLE 9

This Example demonstrates the use of the present method to treat Douglas Fir boards. Alkali silicate treatment solutions AS7 and TS8 (as described above) were used to treat Douglas Fir boards (5 cm×15 cm) using the present method. The alkali silicate solutions were applied separately to boards at 100 psi for five minutes which was followed by application of TS8 in each case at 135 psi for ten minutes and then dried in a kiln at 60° C. for twenty-four hours. The boards were then cut into 1 meter lengths, with a thin wafer being cut from each length for measuring initial borate levels. The borate levels were determined as described above.

Five samples were include and were analyzed for changes in borate levels. The samples were exposed to repeating cycles as described above.

The samples were evaluated initially and after five total cycles. The borate retention was determined as described above. The results are summarized in the table below.

| Sample No. | Borate Retention (wt. %) |
|---|---|
| Example 9 | 23 |

The present invention has been described with reference to specific details of particular embodiments thereof. It is not intended that such details be regarded as limitations upon the scope of the invention except insofar as and to the extent that they are included in the accompanying claims.

What is claimed is:

1. A method of treating substrates comprising:
   applying an alkali silicate solution to one or more substrates; and
   applying an alkali borate solution with boric oxide ($B_2O_3$) content to the substrates, wherein one or both of the alkali silicate solution and the alkali borate solution include one or more wetting agents selected from the group consisting of metasodium silicate, anionic surfactants, cationic surfactants, amphoteric surfactants, zwitterionic surfactants, trisodium phosphate, and tetrasodium pyrophosphate.

2. The method of claim 1, wherein the alkali silicate solution comprises 5 wt. % to 60 wt. % alkali silicate.

3. The method of claim 1, wherein the alkali borate solution comprises 0.1 wt. % to 20 wt. % alkali borate.

4. The method of claim 1, wherein one or both of the alkali silicate solution and the alkali borate solution include a sealant composition.

5. The method of claim 4, wherein the sealant composition comprises one or more selected from the group consisting of wax, paraffin, paraffin wax dispersed in mineral oil, wax in the form of micronized particles, a mixture of a cyclodimethylsiloxane fluid and a polydiorganosiloxane-polyo-xyalkylene copolymer, oxyalkalene polymers, pyridine containing polymers, amine modified polybutadienes, vinyl polymer latexes, styrene butadiene copolymers, hydrogenated styrene butadiene copolymers, thermosetting styrene butadiene copolymers, a styrene-butadiene rubber latex, styrene block copolymers, a moisture-curable sylilated polyurethane prepolymer, a polyethylene wax, an organo silane, a water-based polymeric binder and a wax hydrophobic filler, and mixtures thereof.

6. The method of claim 4, wherein the sealant composition is present in one or both of the alkali silicate solution and the alkali borate solution at a level of from 0.1 wt. % to 20 wt. %.

7. The method of claim 1, wherein one or both of the alkali silicate solution and the alkali borate solution include one or more of a bactericide, insecticide, or fungicide.

8. The method of claim 7, wherein one or both of the alkali silicate solution and the alkali borate solution include one or more bactericides, insecticides, or fungicides selected from the group consisting of methyl paraben, propyl paraben, disodium cyanodithioimidocarbonate, methylene bis thiocyanate, isothiazolin, glutaraldehyde, dithiocarbamates, quaternary ammonium compounds, dibromonitrilopropionamide, dibromo dicyano butane, dodecylguanidine hydrochloride, organophosphate insecticides, organosulfur insecticides, carbamate insecticides, formamidine insecticides, dinitrophenol insecticides, organotin insecticides, pyrethroid insecticides, and nicotinoid insecticides.

9. The method of claim 7, wherein the bactericides, insecticides, or fungicides are present in one or both of the alkali silicate solution and the alkali borate solution at a level of from 0.01 wt. % to 10 wt. %.

10. The method of claim 1, wherein one or both of the alkali silicate solution and the alkali borate solution include one or more rheology modifiers.

11. The method of claim 10, wherein the rheology modifier is one or more selected from the group consisting of cellulosic agents, lignum, lignin, culmonol, acrylic thickeners, alkali swellable latexes, natural gums, and acrylamide-based thickeners.

12. The method of claim 10, wherein the rheology modifier is present in one or both of the alkali silicate solution and the alkali borate solution at a level of from 0.01 wt. % to 5 wt. %.

13. The method of claim 1, wherein the wetting agent is present in one or both of the alkali silicate solution and the alkali borate solution at a level of from 0.01 wt. % to 10 wt. %.

14. The method of claim 1, wherein one or both of the alkali silicate solution and the alkali borate solution include one or more coupling agents.

15. The method of claim 14, wherein the coupling agent is one or more selected from the group consisting of glycol ethers, linear or branched $C_1$–$C_{12}$ alcohols, linear or branched $C_1$–$C_{12}$ acetates, alkali salts of alkyl, aryl, or alkylaryl sulfonates, betaine surfactants, fatty acids, ketones, and D-limonene.

16. The method of claim 14, wherein the coupling agent is present in one or both of the alkali silicate solution and the alkali borate solution at a level of from 0.01 wt. % to 20 wt. %.

17. The method of claim 1, wherein the sodium silicate treatment solution comprises 67 to 84.2 wt. % water, 15 to 20 wt. % sodium silicate, 0 to 10 wt. % of a sealant composition, 0.1 to 2 wt. % of a wetting agent, 0.1 to 2 wt. % of a rheology modifier, 0.1 to 2 wt. % of an alkali borate, and 0 to 0.5 wt. % bactericide, insecticide, or fungicide.

18. The method of claim 1, wherein the molar ratio of silicates to borates is from 42:1 to 1:40.

19. The method of claim 1, wherein the substrate is selected from the group consisting of wood products, green lumber, paper, cardboard, paper towels, sponges, porous plastics, and fabrics.

20. The method of claim 1 further comprising the step of drying the treated wood product through the application of energy.

21. A method of treating substrates comprising:
applying an alkali silicate solution to one or more substrates; and
applying an alkali borate solution with boric oxide ($B_2O_3$) content to the substrates,
wherein the sodium silicate solution comprises a wetting agent having 67 to 84.2 wt. % water, 15 to 20 wt. % sodium silicate, 0 to 10 wt. % of a sealant composition, 0.1 to 2 wt. % of a wetting agent, 0.1 to 2 wt. % of a rheology modifier, 0.1 to 2 wt. % of an alkali borate, and 0 to 0.5 wt. % bactericide, insecticide, or fungicide, and
wherein the wetting agent is a mixture of trisodium phosphate and sodium metasilicate, the sealant composition is a styrene-butadiene copolymer, the rheology modifier is a mixture of lignum and culmonol, and the alkali borate is disodium octaborate tetrahydrate.

22. A method of treating a wood material comprising:
placing the wood material in a pressure vessel and applying a vacuum;
applying an alkali silicate solution to the wood material;
applying an alkali borate solution with boric oxide ($B_2O_3$) content to the wood material;
contacting the wood material with the alkali borate solution;
increasing the pressure in the pressure vessel;
draining the alkali borate solution from the pressure vessel;
contacting the wood material with the alkali silicate solution; and
increasing the pressure in the pressure vessel.

23. The method of claim 22 further comprising the steps of: optionally applying pressure followed by the application of a vacuum and repeating such step; and drying the treated wood product through the application of energy.

24. The method of claim 20, wherein the application of energy includes applying one or more of radiant heat, electrical current, microwaves, lasers, convection ovens, dehydration, and spot heating to high temperatures for short periods of time.

25. The method of claim 22, wherein the pressure in the pressure vessel is from 10 to 500 psi.

26. A substrate treated by a method comprising:
applying an alkali silicate solution to one or more substrates; and
applying an alkali borate with boric oxide ($B_2O_3$) content to the substrates,
wherein one or both of the alkali silicate solution and the alkali borate solution include one or more coupling agents.

27. The substrate of claim 26, wherein the alkali silicate solution comprises 5 wt. % to 60 wt. % alkali silicate.

28. The substrate of claim 26, wherein the alkali borate solution comprises 0.1 wt. % to 20 wt. % alkali borate.

29. The substrate of claim 26, wherein one or both of the alkali silicate solution and the alkali borate solution include a sealant composition.

30. The substrate of claim 29, wherein the sealant composition comprises one or more selected from the group consisting of wax, paraffin, paraffin wax dispersed in mineral oil, wax in the form of micronized particles, a mixture of a cyclodimethylsiloxane fluid and a polydiorganosiloxane-polyo-xyalkylene copolymer, oxyalkalene polymers, pyridine containing polymers, amine modified polybutadienes, vinyl polymer latexes, styrene butadiene copolymers, hydrogenated styrene butadiene copolymers, thermosetting styrene butadiene copolymers, a styrene-butadiene rubber latex, styrene block copolymers, a moisture-curable silylated polyurethane prepolymer, a polyethylene wax, an organo silane, a water-based polymeric binder and a wax hydrophobic filler, and mixtures thereof.

31. The substrate of claim 29, wherein the sealant composition is present in one or both of the alkali silicate solution and the alkali borate solution at a level of from 0.1 wt. % to 20 wt. %.

32. The substrate of claim 26, wherein one or both of the alkali silicate solution and the alkali borate solution include one or more of a bactericide, insecticide, or fungicide.

33. The substrate of claim 32, wherein one or both of the alkali silicate solution and the alkali borate solution include one or more bactericides, insecticides, or fungicides selected from the group consisting of methyl paraben, propyl paraben, disodium cyanodithioimidocarbonate methylene bis thiocyanate, isothiazolin, glutaraldehyde, dithiocarbamates, quaternary ammonium compounds, dibromonitrilopropionamide, dibromo dicyano butane, dodecylguanidine hydrochloride, organophosphate insecticides, organosulfur insecticides, carbamate insecticides, formamidine insecticides, dinitrophenol insecticides, organotin insecticides, pyrethroid insecticides, and nicotinoid insecticides.

34. The substrate of claim 32, wherein the bactericides, insecticides, or fungicides are present in one or both of the alkali silicate solution and the alkali borate solution at a level of from 0.01 wt. % to 10 wt. %.

35. The substrate of claim 26, wherein one or both of the alkali silicate solution and the alkali borate solution include one or more rheology modifiers.

36. The substrate of claim 35, wherein the rheology modifier is one or more selected from the group consisting of cellulosic agents, lignum, lignin, culmonol, acrylic thickeners, alkali swellable latexes, natural gums, and acrylamide-based thickeners.

37. The substrate of claim 35, wherein the rheology modifier is present in one or both of the alkali silicate solution and the alkali borate solution at a level of from 0.01 wt. % to 5 wt. %.

38. The substrate of claim 26, wherein the coupling agent is one or more selected from the group consisting of glycol ethers, linear or branched $C_1$–$C_{12}$ alcohols, linear or branched $C_1$–$C_{12}$ acetates, alkali salts of alkyl, aryl, or alkylaryl sulfonates, betaine surfactants, fatty acids, ketones, and D-limonene.

39. The substrate of claim 26, wherein the coupling agent is present in one or both of the alkali silicate solution and the alkali borate solution at a level of from 0.01 wt. % to 20 wt. %.

40. The substrate of claim 26, wherein the sodium silicate treatment solution comprises 67 to 84.2 wt. % water, 15 to 20 wt. % sodium silicate, 0 to 10 wt. % of a sealant composition, 0.1 to 2 wt. % of a wetting agent, 0.1 to 2 wt. % of a rheology modifier, 0.1 to 2 wt. % of an alkali borate, and 0 to 0.5 wt. % bactericide, insecticide, or fungicide.

41. The substrate of claim 26, wherein the molar ratio of silicates to borates is from 42:1 to 1:40.

42. The substrate of claim 26, wherein the substrate is selected from the group consisting of wood products, green lumber, paper, cardboard, paper towels, sponges, porous plastics, and fabrics.

43. The substrate of claim 26 further comprising the steps of: placing the wood material in a pressure vessel and applying a vacuum; contacting the wood material with the present sodium borate solution; increasing the pressure in the pressure vessel; draining the sodium borate solution from the pressure vessel; contacting the wood material with the present alkali silicate solution; and increasing the pressure in the pressure vessel.

44. The substrate of claim 26 further comprising the step of drying the treated wood product through the application of energy.

45. The substrate of claim 43 further comprising the steps of optionally applying pressure followed by the application of a vacuum and repeating such step; and drying the treated wood product through the application of energy.

46. The substrate of claim 44, wherein the application of energy includes applying one or more of radiant heat, electrical current, microwaves, lasers, convection ovens, dehydration, and spot heating to high temperatures for short periods of time.

47. The substrate of claim 43, wherein the pressure in the pressure vessel is from 10 to 500 psi.

48. A substrate treated by a method comprising:
applying an alkali silicate solution to one or more substrates; and
applying an alkali borate with boric oxide ($B_2O_3$) content to the substrates,
wherein one or both of the alkali silicate solution and the alkali borate solution include one or more wetting agents selected from the group consisting of metasodium silicate, anionic surfactants, cationic surfactants, amphoteric surfactants, zwitterionic surfactants, trisodium phosphate, and tetrasodium pyrophosphate, and wherein the wetting agent is present in one or both of the alkali silicate solution and the alkali borate solution at a level of from 0.01 wt. % to 10 wt. %.

49. A substrate treated by a method comprising:
applying an alkali silicate solution to one or more substrates, wherein the alkali silicate solution comprises 67 to 84.2 wt. % water, 15 to 20 wt. % sodium silicate, 0 to 10 wt. % of a sealant composition, 0.1 to 2 wt. % of a wetting agent, 0.1 to 2 wt. % of a rheology modifier, 0.1 to 2 wt. % of an alkali borate, and 0 to 0.5 wt. % bactericide, insecticide, or fungicide; and applying an alkali borate solution with boric oxide ($B_2O_3$) content to the substrates, wherein one or both of the alkali silicate solution and the alkali borate solution include one or more wetting agents, and wherein the wetting agent is a mixture of trisodium phosphate and sodium metasilicate, the sealant composition is a styrene-butadiene copolymer, the rheology modifier is a mixture of lignum and culmonol, and the alkali borate is disodium octaborate tetrahydrate.

50. A substrate comprising a borate-silicate polymer composition within the substrate, wherein the borate-silicate polymer is the reaction product of an alkali silicate and an alkali borate with boric oxide (B.sub.2O.sub.3) content, the borate-silicate polymer composition comprises one or more of a sealant composition, a wetting agent, a rheology modifier, a bactericide, an insecticide, and a fungicide, and the alkali metal silicate is sodium silicate, the alkali borate is disodium octaborate tetrahydrate, the wetting agent is a mixture of trisodium phosphate and sodium metasilicate, the sealant composition is a styrene-butadiene copolymer, and the rheology modifier is a mixture of lignum and culmonol.

51. The substrate of claim 50, wherein the substrate is selected from the group consisting of wood, wood products, green lumber, paper, cardboard, paper towels, sponges, porous plastics, and fabrics.

52. The substrate of claim 50, wherein the sealant composition comprises one or more selected from the group consisting of wax, paraffin, paraffin wax dispersed in mineral oil, wax in the form of micronized particles, a mixture of a cyclodimethylsiloxane fluid and a polydiorganosiloxane-polyo-xyalkylene copolymer, oxyalkalene polymers, pyridine containing polymers, amine modified polybutadienes, vinyl polymer latexes, styrene butadiene copolymers, hydrogenated styrene butadiene copolymers, thermosetting styrene butadiene copolymers, a styrene-butadiene rubber latex, styrene block copolymers, a moisture-curable silylated polyurethane prepolymer, a polyethylene wax, an organo silane, a water-based polymeric binder and a wax hydrophobic filler, and mixtures thereof.

53. The substrate of claim 50, wherein the substrate is one or more of wood, wood products, and green lumber.

54. A structure built using the substrate of claim 53.

* * * * *